A. F. JENKINS.
OXYACETYLENE CUTTING TORCH.
APPLICATION FILED JULY 6, 1917.
1,318,386.
Patented Oct. 14, 1919.
2 SHEETS—SHEET 1.
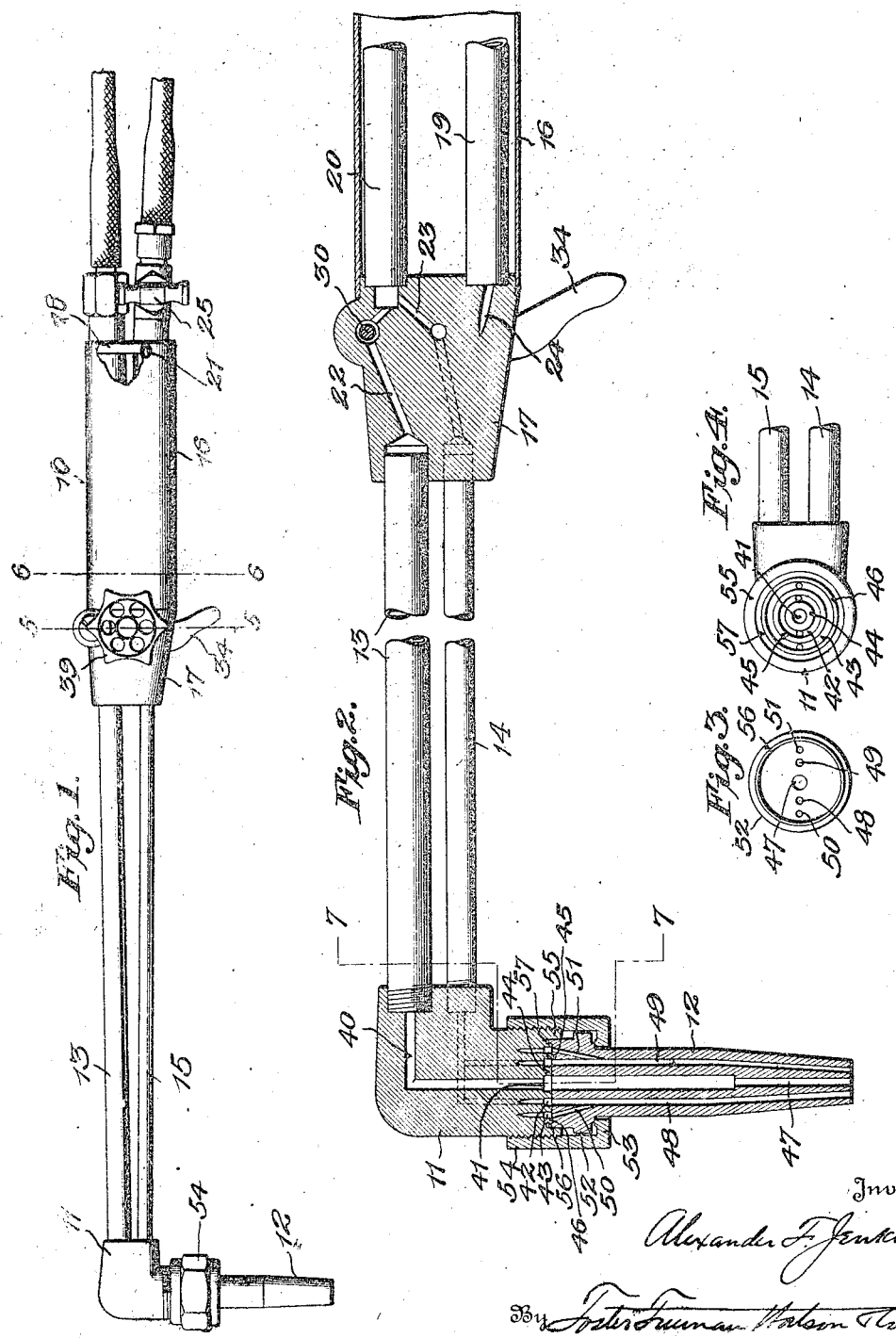
Inventor
Alexander F. Jenkins
By Foster Freeman Watson Toit
Attorney A. F. JENKINS.
OXYACETYLENE CUTTING TORCH.
APPLICATION FILED JULY 6, 1917.
1,318,386.
Patented Oct. 14, 1919.
2 SHEETS—SHEET 2.
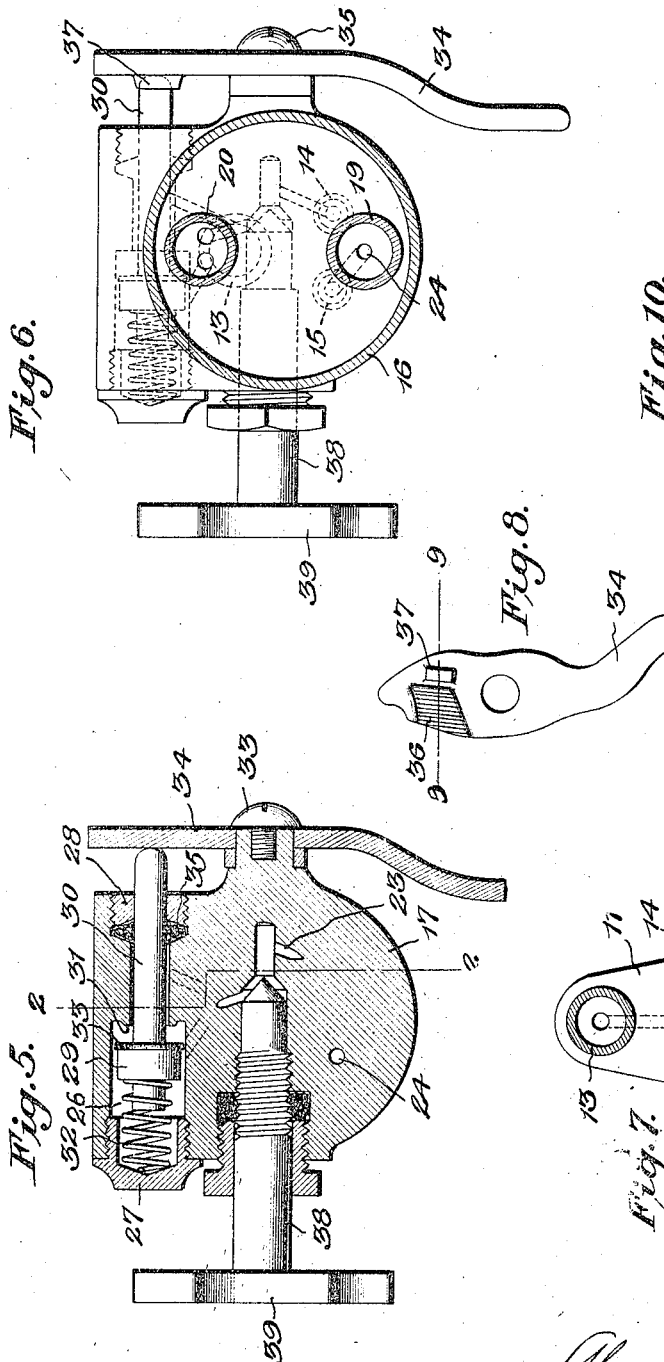
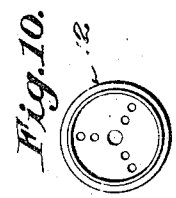
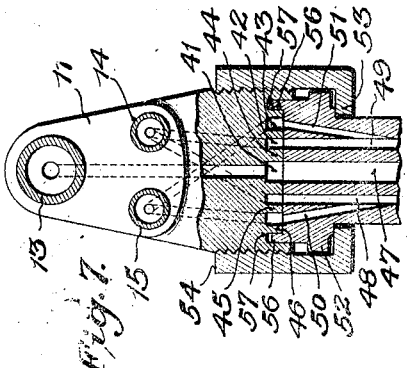
Inventor
Alexander F. Jenkins
By Foster Freeman Watson Hoit
Attorney

UNITED STATES PATENT OFFICE.

ALEXANDER F. JENKINS, OF BALTIMORE, MARYLAND.

OXYACETYLENE CUTTING-TORCH.

1,318,386.

Specification of Letters Patent.  Patented Oct. 14, 1919.

Application filed July 6, 1917. Serial No. 179,003.

*To all whom it may concern:*

Be it known that I, ALEXANDER F. JENKINS, a citizen of the United States, residing at Baltimore, Maryland, have invented certain new and useful Improvements in Oxyacetylene Cutting-Torches, of which the following is a specification.

This invention relates to oxy-acetylene welding and cutting torches and has for its object to provide a torch of this class embodying improvements rendering it of great mechanical strength and durability and promoting ease and convenience in operation.

The invention will be fully disclosed in the following description, taken in connection with the accompanying drawings, in which:

Figure 1 is a side view of the torch, part being broken away;

Fig. 2 is a vertical longitudinal section of portions of the torch drawn to a larger scale;

Fig 3 is a plan view of the base of a burner tip;

Fig. 4 is a plan view of the seating surface of the head;

Fig. 5 is a section along the line 5—5 in Fig. 1;

Fig. 6 is a section along the line 6—6 of Fig. 1;

Fig. 7 is a section along the line 7—7 of Fig. 2;

Fig. 8 is an elevation of the trigger for operating the oxygen valve;

Fig. 9 is a section along the line 9—9 of Fig. 8; and

Fig. 10 is a plan view of the base of a modified form of burner tip.

The torch comprises two principal portions, the handle 10 connected to the source of gas supply and containing the gas controlling mechanism, and the head 11, to which the burner tip 12 is secured. The head 11 is supported at a distance from the handle by the three pipes 13, 14 and 15, which serve the two purposes of conveying the gas to the head and supporting the same.

The handle portion 10 consists of a casing 16 which is adapted to be grasped by the hand when the torch is in use, a body member 17, at one end thereof, a block 18 (see Fig. 1) at the other end thereof, and two gas pipes 19 and 20 rigidly connecting the body and block and rigidly securing them together. The casing 16 is cylindrical and is secured to the block 18 by screws 21. Each of the two pipes 19 and 20 connect with a flexible gas supply pipe through which the oxygen and acetylene is conveyed to the torch from suitable containers or reservoirs, the oxygen being conducted into pipe 20 and the acetylene into pipe 19.

The body 17 has three ducts passing therethrough in a general longitudinal direction, for transmitting the gases from the pipes 19 and 20 to the pipes 13, 14, and 15, two of the ducts, indicated by 22 and 23 in the drawings, connecting the oxygen pipe 20 with the oxygen pipes 13 and 14, and the duct 24 connecting the acetylene 19 with the pipe 15 which conveys the acetylene to the head. Each of the two oxygen ducts 22 and 23 has a regulating valve intermediate its ends for governing the flow of gas therethrough, the flow of acetylene being controlled by the valve 25 at the rear of the handle.

The duct 22 through which the oxygen passes to what is known as the cutting jet of the torch, has an enlarged lateral chamber 26 closed at the ends by screw plugs 27 and 28, and having therein a valve 29 mounted upon the valve stem 30 and normally held against the annular valve seat 31 by the coiled compression spring 32. The face of the valve is preferably provided with a rubber washer 33 to prevent the leakage of the gas, which is under high pressure. The valve seat 31 is formed on the end of the larger part of the transverse chamber 26, and when the valve 29 is seated thereon no oxygen can pass from the larger portion of the chamber to the smaller, which is the direction of flow of the gas in passing through the duct. This is clearly indicated in Fig. 5, in which dotted lines indicate the points where the gas enters the larger portion of chamber 26 and leaves the smaller portion. The pressure of the oxygen being behind the valve when the latter is closed, tends to maintain it tightly closed, and thus minimizes leakage.

The valve stem 30 extends through, and is of smaller cross section than the smaller part of the chamber 26, thus permitting gas to flow into said chamber. The stem 30 also extends through the screw plug 28 to the exterior of the body where its rounded end is adapted to coöperate with the trigger 34 to open the valve against the pressure of the spring, and of the compressed gas behind the valve. Packing 35 is placed around the valve stem just inside the screw plug 28, to prevent leakage.

The trigger 34 is pivoted at 35 to the side of the body and is adapted to be oscillated manually by the fingers of the right hand to open the valve 29 and to allow the same to close. To attain this object it is provided on the inner side of its upper end, with the inclined or cam surface 36, which comes in contact with the rounded end of valve stem 30 when the upper portion of the trigger is moved forward to wedge or push the valve rod inwardly. A stop 37 is also provided to properly limit the movement of the trigger in opening the valve. To allow the valve to be closed by the spring 32 the trigger is simply moved in the reverse direction by pushing the lower part forward or by drawing the upper part back with the thumb.

The inclined surface 36 is so shaped that when the valve is opened the friction between the inclined portion and the end of valve stem 30 is sufficient to prevent any accidental movement of the trigger to release the valve. This enables the operator to turn the cutting jet on and then remove his hand, from the controlling trigger without cutting the jet off, which is a very desirable feature in such a device.

The oxygen passing through duct 23 is regulated by needle valve 38 having the convenient handle 39. The needle valve 38 is of the usual type and is operated by the left hand in using the torch.

The pipes 13, 14 and 15, are screw threaded into one face of the L-shaped head 11 and communicate with ducts therein which conduct the gases through the head and deliver them unmixed to the burner tip. The oxygen entering the head from pipe 13 is conducted through the L-shaped duct 40 to a recess 41, in that face of the head against which the tip is seated while the oxygen entering through the pipe 14 and the acetylene entering through pipe 15 are conveyed to the annular recesses 42 and 43 concentric with the recess 41. As shown by the dotted lines in Figs. 2 and 7 these last two mentioned ducts branch within the head in order to convey the gases to the opposite sides of the concentric recesses. In Fig. 7 the ducts have been shown distorted in order to clearly illustrate this. In Fig. 4 the orifices of the several ducts above mentioned are clearly shown.

The concentric walls of recesses 41, 42 and 43, are indicated by 44, 45 and 46 in the drawings, and the top or end surfaces of these walls abut tightly against the plane surface of the base of the tip 12, so that the gases cannot mix at this point. I have found it very desirable to make the ends or bearing surfaces of these walls of equal area, notwithstanding their different circumferences, in order that each will offer the same resistance to the abutting surface of the tip when the latter is clamped to the head. If the bearing surfaces of the concentric walls are unequal in area the weaker walls will be crushed when the tip is securely attached, hence the innermost wall is thickest, the intermediate wall thinner and the outermost wall still thinner. The burner tip 12 is provided with ducts for leading the gases from the recesses 41, 42 and 43 to the point of the tip, where they are burned. An axial duct 47 receives the oxygen from the recess 41 in the head and leads it to the center point of the tip, while ducts 48 and 49, with the short branches 50 and 51 therefrom respectively, convey the gases from the annular recesses 42 and 43 to the point of the tip, the ducts 48 and 49 converging slightly as they near the point.

Oxygen unmixed with other gases and under high pressure issues from the duct 47, and this jet is known as the cutting jet, while oxygen at a somewhat lower pressure (as regulated by needle valve 38) enters ducts 48 and 49 from annular recess 42 and draws acetylene into these duc from the branches 50 and 51 respectively by an injector action, due to its higher pressure. The ducts 48 and 49 are thus mixing tubes.

Near the base of the tip is an annular flange 52 which is engaged by the flange 53 of the sleeve nut 54 which is screw threaded to the head. This mode of attachment allows the tip to be easily detached and cleaned or turned or a different one substituted.

In handling the torch when the tip is not attached thereto and in handling the tip itself apart from the torch, the seating surfaces which are adapted to abut when the parts are together are exposed and are liable to be injured by rough or careless handling. As these surfaces must be true and fit tightly together to prevent gas leakage I provide both the head and the tip with annular flanges 55 and 56 respectively, which extend beyond the seating surfaces in question and protect them from injury when dropped or roughly handled. The flange 56 on the tip is received within the annular recess 57 in the head, which recess is made deep enough to prevent the flange from seating and perhaps interfering with the proper seating of the other surfaces.

Having thus described the invention what I claim and desired to secure by Letters Patent, is:

1. In a torch of the class described, the combination with the torch head having a flat seating surface provided with gas orifices and with a circular flange surrounding said orifices and projecting beyond said surface, of a detachable tip having a flat seating surface provided with gas orifices and with a circular flange surrounding the said orifices and projecting beyond the seating surface of the tip, said flanges being out of register and overlapping when the head and tip are assembled, and means for detachably securing the tip to the head.

2. In a cutting and welding torch having a head, a burner tip adapted to be secured to the head, one of said parts having a plurality of concentric seating surfaces arranged in a common plane and adapted to abut against a seating surface of the other part, said concentric seating surfaces being substantially equal in area.

3. In a cutting and welding torch, a handle having a body portion provided with gas ducts passing therethrough, a laterally movable valve within said body for opening and closing one of said ducts, a trigger without said body and arranged to be oscillated in a plane parallel to the longitudinal axis of said torch handle, and means on said trigger for operating said valve.

4. In a cutting and welding torch, a body portion having a gas duct passing therethrough, a valve in said duct, having a valve stem extending to the outside of said body, a spring normally holding the valve in its closed position, and means for opening the valve and holding it open against the tension of the spring, said means comprising a trigger pivotally secured to said body to move in a plane parallel to the axis of the body and bearing against the end of the valve stem, said trigger being manually operable and constructed with valve operating surfaces whereby the trigger is adapted to remain in one position to hold the valve open or in another position to allow the valve to remain closed.

5. In a cutting and welding torch, a body portion having a gas duct passing therethrough, a portion of said duct extending laterally of said body and being enlarged to form a chamber, a laterally movable valve in said chamber adapted to seat against one end thereof to interrupt the flow of gas, a spring in said chamber normally holding said valve against its seat, a valve stem extending without the body portion, and means for operating said valve and stem, said means comprising a trigger pivotally secured to the body and having at its upper end an inclined surface adapted to bear against the outer end of the valve stem and to move the latter to open the valve against the tension of the spring when the trigger is moved in one direction, and to allow the spring to close the valve when the trigger is moved in the opposite direction, said trigger being adapted to be manually operated and to remain in either of its positions when so placed.

In testimony whereof I affix my signature.

ALEXANDER F. JENKINS.